United States Patent
Daman et al.

(10) Patent No.: US 11,190,631 B2
(45) Date of Patent: Nov. 30, 2021

(54) SYSTEM AND METHOD OF GENERATING IN-VEHICLE FAVORITE CONTACTS LIST

(71) Applicant: Nissan North America, Inc., Franklin, TN (US)

(72) Inventors: Rami Daman, West Bloomfield, MI (US); Adam Saganski, Farmington Hills, MI (US); Mohammad Sous, Dearborn Heights, MI (US); Asif Bader, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/587,911

(22) Filed: Sep. 30, 2019

(65) Prior Publication Data

US 2021/0099562 A1   Apr. 1, 2021

(51) Int. Cl.
| | | |
|---|---|---|
| H04M 1/00 | (2006.01) | |
| H04M 3/00 | (2006.01) | |
| H04M 1/2746 | (2020.01) | |
| H04M 1/60 | (2006.01) | |
| H04M 1/27457 | (2020.01) | |
| H04M 1/27495 | (2020.01) | |

(52) U.S. Cl.
CPC ..... *H04M 1/2746* (2020.01); *H04M 1/27457* (2020.01); *H04M 1/27495* (2020.01); *H04M 1/6083* (2013.01)

(58) Field of Classification Search
CPC .......... H04M 1/2746; H04M 1/27457; H04M 1/27495
See application file for complete search history.

(56) References Cited

U.S. PATENT DOCUMENTS

| | | | |
|---|---|---|---|
| 5,303,288 A | 4/1994 | Duffy et al. | |
| 8,688,175 B2 | 4/2014 | Saitoh et al. | |
| 10,506,370 B1* | 12/2019 | Alasry | G07C 5/008 |
| 2009/0111530 A1* | 4/2009 | Nakayama | H04M 1/2746 |
| | | | 455/569.2 |
| 2012/0046864 A1* | 2/2012 | Zilka | G01C 21/3679 |
| | | | 701/533 |
| 2012/0157069 A1* | 6/2012 | Elliott | H04M 1/6091 |
| | | | 455/418 |
| 2013/0122969 A1* | 5/2013 | Saitoh | H04M 1/6091 |
| | | | 455/569.2 |
| 2013/0242032 A1 | 9/2013 | Rahman et al. | |
| 2014/0270131 A1* | 9/2014 | Hand | H04M 3/42 |
| | | | 379/208.01 |
| 2014/0277932 A1* | 9/2014 | Prakah-Asante | H04M 1/6091 |
| | | | 701/36 |
| 2014/0323111 A1* | 10/2014 | Ning | H04M 1/72436 |
| | | | 455/418 |

(Continued)

*Primary Examiner* — Simon King
(74) *Attorney, Agent, or Firm* — Global IP Counselors, LLP

(57) ABSTRACT

A system and method of generating an in-vehicle favorite contacts list includes pairing a first mobile device with an in-vehicle infotainment system, and transferring data from the first mobile device to the in-vehicle infotainment system. The data includes a contacts list from the mobile device. The transferred data is weighted, and an in-vehicle favorite contacts list is generated based on the weighted data. The generated in-vehicle favorite contacts list is displayed on a display in the vehicle.

16 Claims, 6 Drawing Sheets

(56) References Cited

U.S. PATENT DOCUMENTS

| | | | | |
|---|---|---|---|---|
| 2015/0331572 A1* | 11/2015 | Mischke | ............ | G06F 3/04817 715/769 |
| 2017/0255667 A1* | 9/2017 | Ochiai | ................ | G06F 16/2365 |
| 2019/0332106 A1* | 10/2019 | Belloni Mourao | .... | B60K 28/06 |

* cited by examiner

| Config Table | | | |
|---|---|---|---|
| Time Frame (Configureable) | Source | Frequency Count (Per Contact + Phone Type Or Phone Number) | Weight (Configureable) |
| a = Most Recent 2 Weeks | Call Hist | $x_n$ | $W_a$ (*75%) |
| b = 2 Weeks Before a | Call Hist | $Y_n$ | $W_b$ (*50%) |
| c = 2 Weeks Before b | Call Hist | $W_n$ | $W_c$ (*25%) |
| d = Any Prior To c | Call Hist | $Z_n$ | $W_d$ (*10%) |
| | | | |
| e = Most Recent 2 Weeks | SMS | $T_n$ | $W_e$ (*40%) |
| f = 2 Weeks Before e | SMS | $U_n$ | $W_f$ (*30%) |
| g = 2 Weeks Before f | SMS | $V_n$ | $W_g$ (*10%) |

FIG. 6

| Logic Table | | |
|---|---|---|
| # | Variable | Source Of Variable/Comments |
| — | $t$ = Time Period | Call History Or SMS Time Frame Searching Within This Time Period |
| — | $i_n$ = Unique List Element | Call History Or SMS "Unique List Element" Count "Unique List Element" Can Be Either: (1) Contact Name + Phone Type (2) Phone Number |
| 1 | While $t$ Within $a$ | $a$ = Configurable Time Frame |
| 2 | Search For Repeating List elements $i_n$ Within Time Frame $a$ | Finding All The Unique Elements Within The Time Frame |
| 3 | $x_n$ = (Total Count Of $i_n$) * $w_a$ | $x_n$ = Frequency Count $w_a$ = Weight Per Element's Time Frame |
| 4 | Repeat 1-3 For All Time Frame Per $i_n$ | Search For All Repeating Elements For Each Time Frame Listed And Multiply By Weight. Keep Track Of Frequency Count For Each Time Frame. Repeat 1-3 Until All Time Frame Exhausted For $i_n$ |
| 5 | Sum Of ($x_n + y_n + w_n + z_n$ .......) | Frequency Count Sum (For All Time Frames + Unique List Element) |
| 6 | Repeat 1-5 For All Unique List Elements | |
| 7 | Sort Each $i_n$ By Highest Frequency Count Sum | Sum From #5 For Each Unique List Element |
| 8 | Populate Favorites Based On Highest Frequency Count Sum | |

FIG. 7

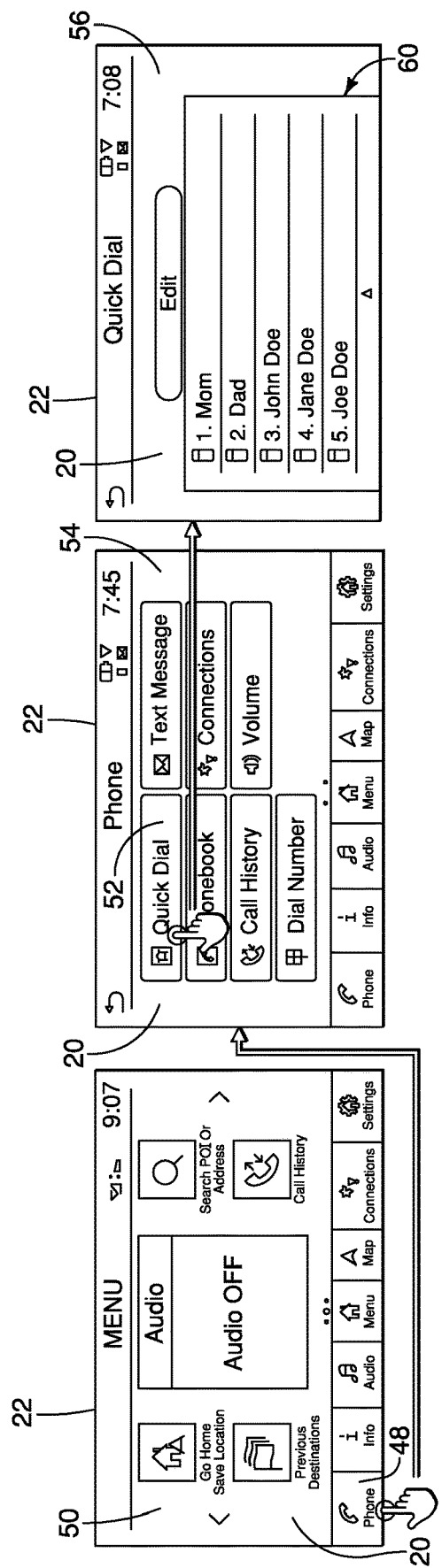

SYSTEM AND METHOD OF GENERATING IN-VEHICLE FAVORITE CONTACTS LIST

BACKGROUND

Field of the Invention

The present invention generally relates to a system and method of generating an in-vehicle favorite contacts list. More specifically, the present invention relates to a system and method of generating an in-vehicle favorite contacts list with minimal user interaction.

Background Information

In-vehicle infotainment systems (IVI) offer capability for a user to wirelessly connect, such as by Bluetooth, a multi-purpose mobile computing device, such as a smartphone, thereby allowing the transfer of the device's data. The data can include phonebook contacts, call history, text messages, and so forth, to the IVI through the wireless connection, such as by Bluetooth Special Interest Group (SIG) Protocol Standards. The transmitted data is then available to vehicle occupants for safe and easy phone tasks without having to manipulate the phone while in the vehicle.

The device allows the user to save their favorite or frequently dialed contacts for quick dialing access by pressing a single button. This is typically accomplished by selecting the desired contact or phone number from the device's phonebook or call history.

IVI's also allow the user to save favorite contacts. However, existing IVI's and devices do not support transferring a favorite contacts list from the device through the wireless connection, such as Bluetooth, to the IVI. The user must manually establish their favorite contacts list in the IVI through a burdensome user interface that requires multiple steps for each contact to be added.

SUMMARY

An object of the disclosure is to provide a system and method of generating an in-vehicle favorite contact list.

In view of the state of the known technology, one aspect of the present disclosure is to provide a system and method of generating an in-vehicle favorite contacts list. A first mobile device is paired with an in-vehicle infotainment system. Data from the first mobile device is transferred to the in-vehicle infotainment system. The data includes a contacts list from the mobile device. The transferred data is weighted, and an in-vehicle favorite contacts list is generated based on the weighted data. The generated in-vehicle favorite contacts list is displayed on a display in the vehicle.

Another aspect of the present invention includes an in-vehicle favorite contacts list generating system. An in-vehicle infotainment system is configured to connect to a first mobile device to receive data therefrom. A controller is configured to weight the received data and to generate an in-vehicle favorite contacts list based on the weighted data. A display configured to display the generated in-vehicle favorite contacts list.

Also other objects, features, aspects and advantages of the disclosed system and method of generating an in-vehicle favorite contacts list will become apparent to those skilled in the art from the following detailed description, which, taken in conjunction with the annexed drawings, discloses exemplary embodiments of the system and method of generating an in-vehicle favorite contacts list.

BRIEF DESCRIPTION OF THE DRAWINGS

Referring now to the attached drawings which form a part of this original disclosure:

FIG. 6 is a configuration table of weight factors assigned to data based on a time frame in which the source information was generated;

FIG. 7 is a logic table for generating the in-vehicle favorite contacts list; and FIGS. 8A-8C are diagrammatic illustrations of a method of using the generated in-vehicle favorite contacts list.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
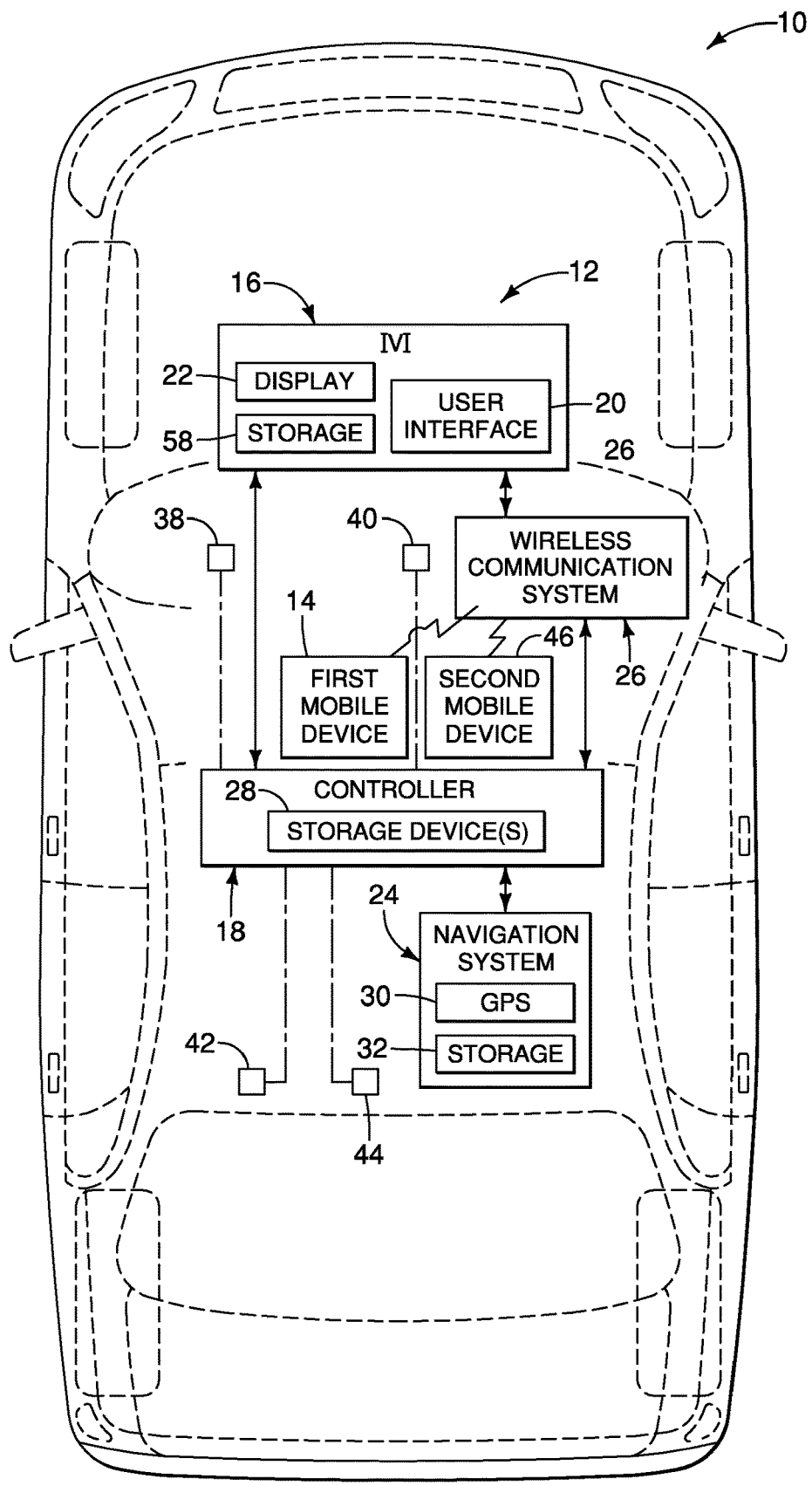
FIG. 1 is a block diagram of a vehicle equipped with the in-vehicle favorite contacts list system in accordance with exemplary embodiments of the present invention.
Figure 3:
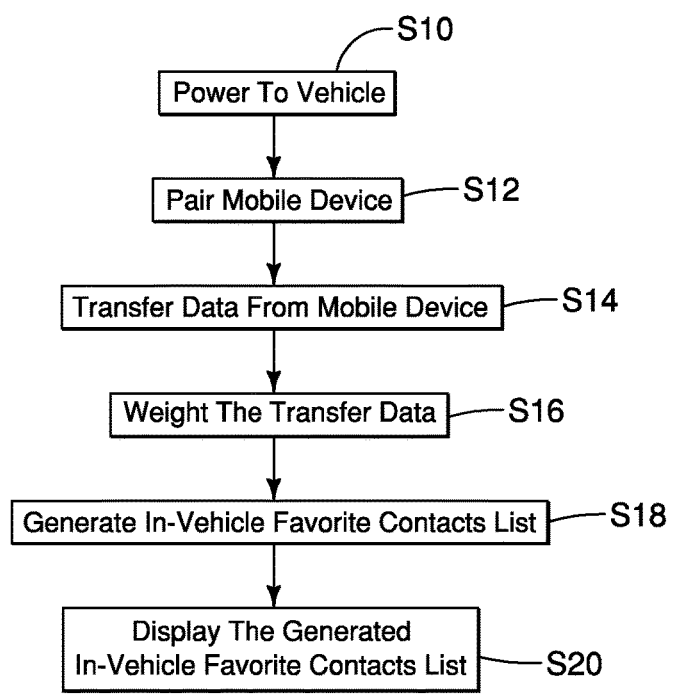
FIG. 3 is a flowchart of a method of generating an in-vehicle favorite contacts list in accordance with an exemplary embodiment of the present invention.
Figure 4:
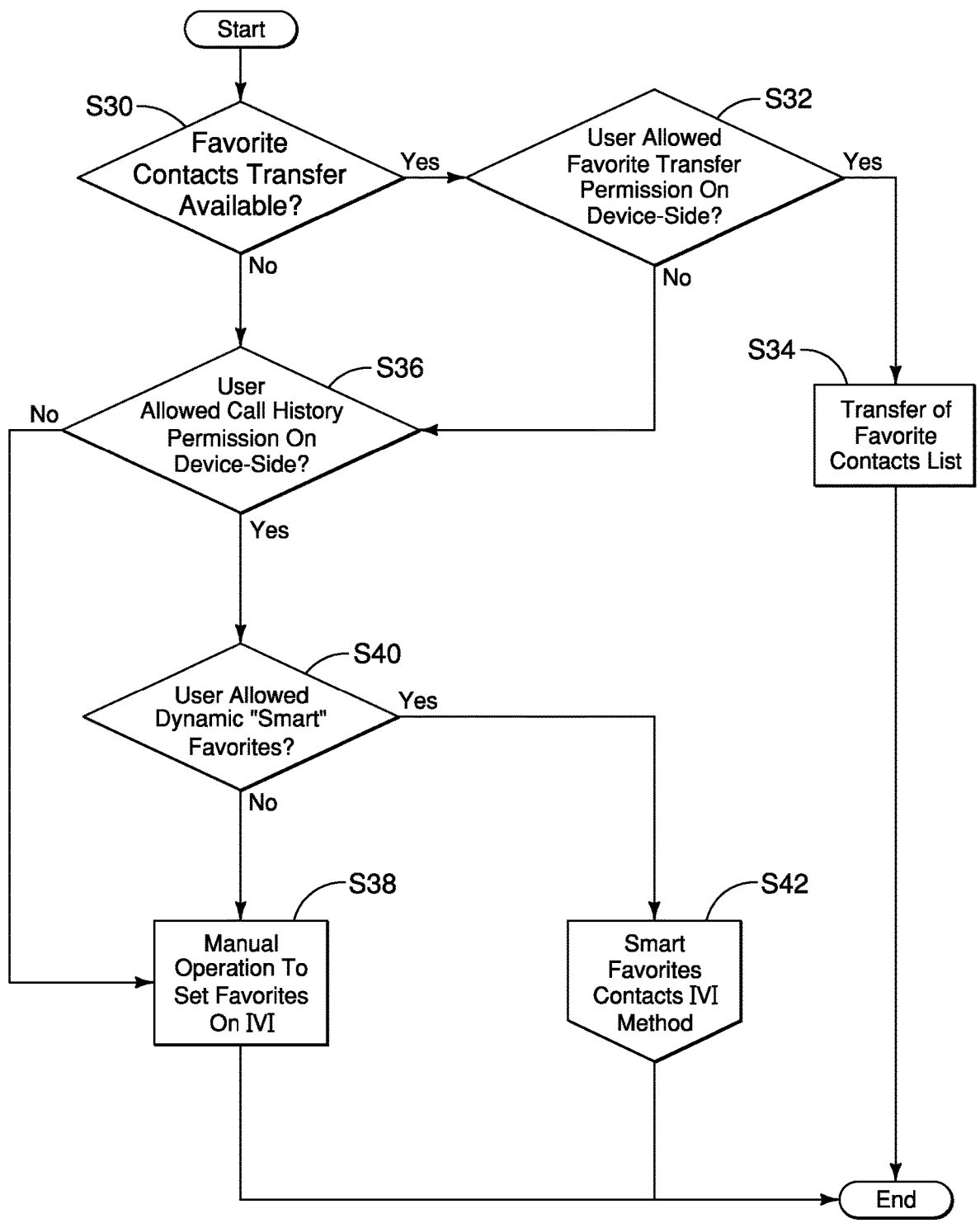
FIG. 4 is a flowchart illustrating methods of generating an in-vehicle favorite contacts list.
Figure 5:
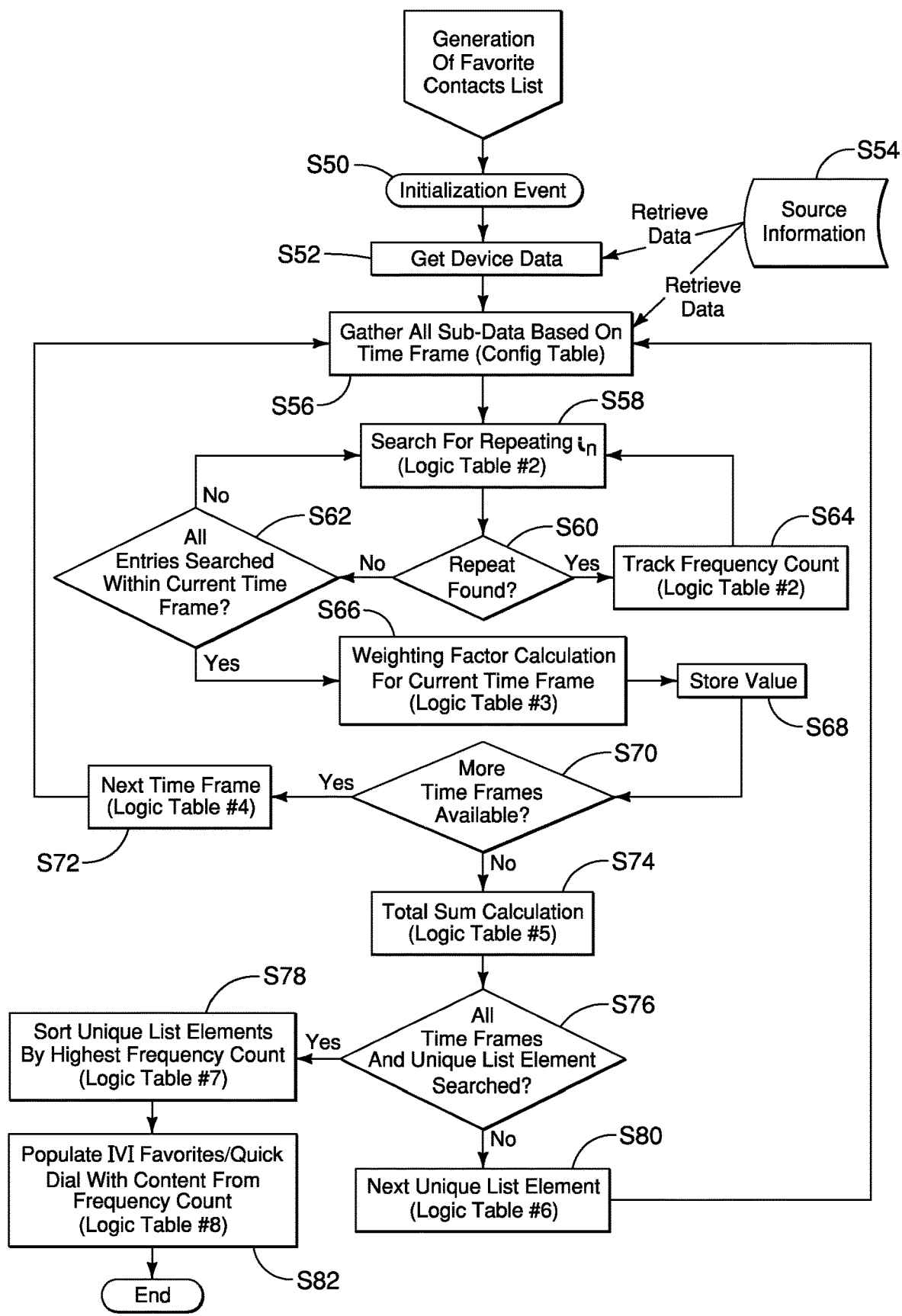
FIG. 5 is a flowchart illustrating generating an in-vehicle favorite contacts list in accordance with an exemplary embodiment of the present invention.

Referring initially to FIG. 1, a vehicle 10 including a favorite contacts list generating system 12 is illustrated in accordance with an exemplary embodiment of the present invention. The vehicle 10 is equipped with the favorite contacts list generating system 12 configured to generate a favorite contacts list in accordance with the flowcharts of FIGS. 3-5 and the tables of FIGS. 6 and 7. FIG. 3 illustrates a method of generating an in-vehicle favorite contacts list in accordance with an exemplary embodiment of the present invention. FIG. 4 illustrates methods of generating an in-vehicle favorite contacts list. FIG. 5 illustrates generating an in-vehicle favorite contacts list in accordance with an exemplary embodiment of the present invention. FIG. 6 is an exemplary configuration table of weight factors assigned to data based on a specified time frame in which the data was generated. FIG. 7 is an exemplary logic table for generating the in-vehicle favorite contacts list. FIGS. 8A-8C diagrammatically illustrate a method of accessing and using the generated in-vehicle favorite contacts list.

The favorite contacts list generating system 12 for the host vehicle 10 is illustrated in accordance with an exemplary embodiment of the present invention. The favorite contacts list generating system 12 includes the in-vehicle infotainment system (IVI), at least one multi-purpose mobile computing device, such as the first mobile device 14, and a controller 18. While the following description refers to the generated list as a favorite contacts list, the generated list can also be referred to as a frequent contacts list, a quick dial list, or any other list of favorite and/or frequently dialed contacts.

The IVI 16 includes a user interface 20 and a display 22. The user interface 20 is an electronic interface that receives information, such as data, from the mobile device 14. The received information can then be transmitted to the controller 18. The user interface 20 is configured to receive the information from the mobile device 14 through the wireless communication system 26. The IVI 16 also includes the display 22 that includes conventional touch screen controls. The user interface 20 and the display 22 allow a vehicle occupant to interact with the favorite contacts list generating system 12, such as by selecting options or inputting information as necessary. The IVI 16 can further include a storage device 58 to store programs and/or information, such as programs and/or information associated with the generation of the favorite contacts list 60 (FIG. 8C).

The controller 18 preferably includes a microcomputer with a control program that is configured to control the components of the favorite contacts list generating system 12 as discussed below. The controller 18 includes other conventional components, such as an input interface circuit, an output interface circuit, and storage device(s), such as a ROM (Read Only Memory) device and a RAM (Random Access Memory) device. The microcomputer of the controller 18 is at least programmed to control the favorite contacts list generating system 12 in accordance with the flowcharts of FIGS. 3-5 and the tables of FIGS. 6 and 7 discussed below. The microcomputer of the controller 18 is programmed to control the IVI 16, a navigation system 24, and a wireless communication system 26, and to make determinations or decisions, as discussed herein. The memory circuit stores processing results and control programs, such as ones for the IVI 16, the navigation system 24, and the wireless communication system 26. The controller 18 is operatively coupled to the IVI 16, the navigation system 24, and the wireless communication system 26 in a conventional manner, as well as other electrical systems in the host vehicle 10, such the turn signals, windshield wipers, lights and any other suitable systems. Such a connection enables the controller 18 to monitor and control any of these systems as desired. The internal RAM of the controller 18 stores statuses of operational flags and various control data. The internal ROM of the controller 18 stores the information for various operations. The controller 18 is capable of selectively controlling any of the components of the favorite contacts list generating system 12 in accordance with the control program. It will be apparent to those skilled in the art from this disclosure that the precise structure and algorithms for the controller 18 can be any combination of hardware and software that will carry out the functions of the exemplary embodiments of the present invention. Furthermore, the controller 18 can communicate with the other components of the favorite contacts list generating system 12 discussed herein via, for example a controller area network (CAN) bus or in any other suitable manner as understood in the art.

The controller 18 can include or be in communication with a user interface 20 of the IVI 16. The user interface 20 can include, for example, a human-machine interface (HMI), such as a control panel or a touchscreen graphical user interface (GUI), which enables a user (e.g., the driver and/or passenger) to interact with the favorite contacts list generating system 12 as understood in the art and discussed herein. The user interface 20 can be incorporated with the display 22 to facilitate interaction by a user. The controller 18 can further include or be in communication with one or more storage devices 28, such as a vehicle memory, that can store information as described herein.

The favorite contacts list generating system 12 of the host vehicle 10 can further include the vehicle navigation system 24. The vehicle navigation system 24 includes, for example, a communication device 30, such as a GPS (Global Positioning System) communication device, that communicates with the GPS satellites. The communication device 30 can also communicate with one or more terrestrial units and a base station or external server to obtain location information. Furthermore, the vehicle navigation system 24 can include or is in communication with a storage device 32 that can store vehicle information, such as previous vehicle route information, location information, or other vehicle information that the GPS is capable of generating, in addition to map data and other location related data as understood in the art. The vehicle navigation system 24 can receive vehicle data from any suitable source, such as a remote device capable of connecting with the navigation system 24.

The favorite contacts list generating system 12 of the host vehicle 10 can further include the wireless communication system 26. The wireless communication system 26 is a communication transceiver for performing a wireless communication with an external wireless communication device, as is understood in the art. The wireless communication system 26 can be configured for short-range wireless communication, such as Bluetooth, and/or for communication over a wireless network.

Figure 2:
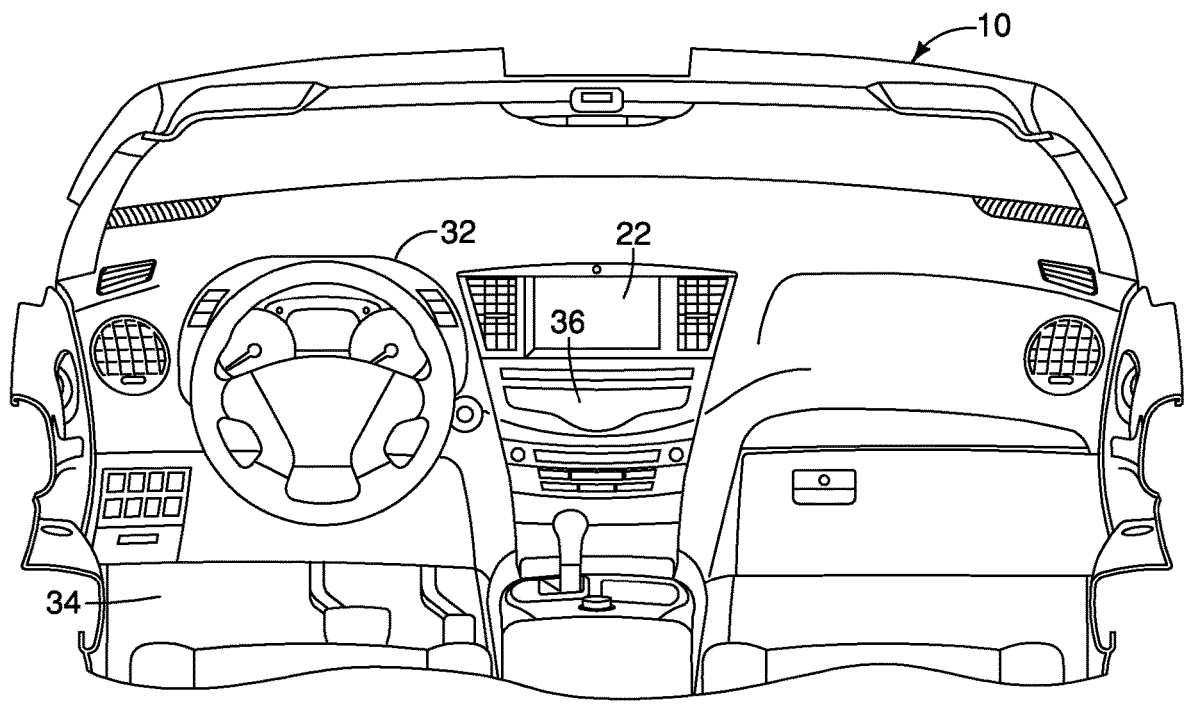
FIG. 2 is a perspective view of an instrument panel in a passenger compartment of the vehicle of FIG. 1.

As shown in FIG. 2, an instrument panel 32 is located within a passenger compartment 34 of the host vehicle 10. The display 22 and a control panel 36 can both be disposed as part of the instrument panel 32. The control panel 36 can also function as part of the user interface 20 of the IVI 16 for a user to engage the favorite contacts list generating system 12.

The vehicle 10 can further include occupancy sensors 38, 40, 42 and 44 to determine the presence of an occupant in a particular seat. As shown in FIG. 1, front occupancy sensors 38 and 40 determine the presence of a driver and a passenger, respectively. Rear seat occupancy sensors 42 and 44 determine the presence of an occupant in the rear seats on the driver side and passenger side, respectively. Each of the sensors 38, 40, 42 and 44 is connected to the controller 18. The occupancy sensors 38, 40, 42 and 44 can be any suitable sensor for detecting the presence of an occupant in the passenger cabin. Responsive to detection of an occupant, the IVI can query whether the detected occupant has a device to be connected to the IVI to transfer information thereto.

FIG. 3 illustrates a method of generating an in-vehicle favorite contacts list 60 (FIG. 8C), which begins with an initialization event in step S10, such as supplying power to the vehicle 10. In step S12, the device 14 is paired to the IVI 16. When the device 14 has been previously paired to the IVI, the process moves to step S14. In step S14, data is transferred from the device 14 to the IVI 16. A flowchart illustrating the process of transferring data to the IVI 16 is shown in FIG. 4. In step S16, the transferred data is weighted. In step S18, an in-vehicle favorite contacts list 60 (FIG. 8C) is generated based on the weighted data. FIG. 5 illustrates a process of weighting the transferred data and generating the in-vehicle favorite contacts list based on the weighted data. In step S20, the generated in-vehicle contacts list is displayed 60 (FIG. 8C), such as on the display 22 of the IVI 16.

FIG. 4 illustrates methods of populating the favorite contacts list on the IVI 16 by utilizing information available from the device 14 or the IVI 16. The IVI 16 auto-populates the favorite contacts list with minimal user interaction. As shown in FIG. 4, several methods of managing the favorite contacts list are illustrated. In a first method, the favorite contacts list is wirelessly transferred, such as by Bluetooth, when the device 14 supports this feature (see step S34). In a second method, the user manually sets favorites by a conventional operation by choosing contacts from the device's phonebook to populate the favorite contacts list (see step S38). In a third method in accordance with exemplary embodiments of the present invention, the IVI 16 processes available information to logically determine the best candidates to auto-populate the favorite contacts list (see step S42). The three illustrated methods of populating the favorite contacts list on the IVI 16 are merely exemplary, and other methods can be practiced to generate a favorite contacts list with the IVI 16.

As shown in step S30 of FIG. 4, a determination is made whether the device 14 supports wirelessly transferring, such as by Bluetooth, the device's favorite contacts list to the IVI 16. When the device 14 supports the wireless transfer of the favorite contacts list, a determination is made whether the user allows the favorite contacts list to be wirelessly transferred on the device-side in step S32. When the user allows such transfer, the favorite contacts list is wirelessly transferred in step S34. The wireless transfer can be by any suitable method, such as by Bluetooth SIG protocol standards. Alternatively, the transfer can be accomplished by connecting the device 14 to the IVI 16 through a USB port of the vehicle 10. When the device 14 does not support the wireless transfer of the device's favorite contacts list in step S30 or when the user does not allow the transfer of the favorite contacts list in step S32, the process moves to step S36.

In step S36, a determination is made whether the user allows the call history of the device 14 on the device-side to transfer to the IVI 16. When the user does not grant permission to transfer the device's call history, the process moves to step S38 in which the user manually sets favorites by a conventional operation of selecting contacts from the phonebook of the device 14.

When the user grants permission to transfer the device's call history in step S36, a determination is made in step S40 whether the user allows dynamic smart favorites, or the in-vehicle favorite contacts list, to be generated. When the user does not grant permission to generate the favorite contacts list in step S40, the process moves to step S38 in which the user manually sets favorites by a conventional operation of selecting contacts from the phonebook of the device 14. When the user grants permission to generate the favorite contacts list in step S40, the process moves to step S42 in which a favorite contacts list is generated. The IVI 16 processes available information to determine the best candidates to auto-populate the favorite contacts list, as illustrated in the flowchart of FIG. 5.

Referring to FIG. 5, a method of generating an in-vehicle favorite contacts list is illustrated. The process begins in step S50 with an initialization event, such as power being supplied to the vehicle 10. The initialization event includes, but is not limited to, cycling the ignition to the accessory/run setting (in other words, power is supplied to the vehicle 10), pairing of a new device with the IVI 16 (such as a second mobile device 46 as shown in FIG. 1), connecting or reconnecting a previously paired device with the IVI 16 (such as the first mobile device 14 in FIG. 1), allowing permission through the device 14 (see steps S40 and S42 of FIG. 4), selecting a favorite contacts option through a settings option through the user interface 20 of the IVI 16, and receiving a new call or text message (SMS) while in the vehicle 10 (to dynamically update a favorite contacts list previously generated with the IVI).

In step S52, the IVI 16 causes data to be gathered from the device 14. In step S54, source information from the device 14 is transferred to the IVI 16. The source information can include any data to facilitate predicting the user's calling habits and/or contact priorities, which can be dependent on a specific scenario. The following description of source information is merely exemplary and not exhaustive of the source information that can be utilized to generate the in-vehicle favorite contacts list.

The source information transferred in step S54 can include the call history of the device 14. The call history can include both incoming and outgoing calls associated with the same phone number. The call history can further include information regarding the frequency of communication with a specific contact and phone type (in other words, a mobile number, an office number, a home number, and so forth) and the frequency of communication with a particular phone number. The source information can further include SMS and/or text messages, contacts from external messaging applications (such as Facebook Messenger, What's App, and so forth), and contacts from social media applications. The SMS/text messages can include both incoming and outgoing text messages associated with the same phone number.

The source information transferred in step S54 can further include location history from the device 14. The location history can include people that have been visited or a periodic occurrence when at a particular location. For example, the user travels to Toronto multiple times a year, such that information regarding contacts and locations in Toronto would be gathered.

The source information transferred in step S54 can further include information regarding the current vehicle occupants, such as by in-vehicle connected and available devices, such as the second mobile device 46 (FIG. 1). Additionally, location tracking or other method of proximity determination can be used to determine other contacts in the vicinity of the first mobile device 14. Information can also be transferred with friends from social media applications that are detected to be within a predetermined proximity. Further, an in-vehicle microphone can be set to a listening mode such that predefined phrases can trigger information to be transferred, such as the contact information for a restaurant heard by the microphone.

The source information transferred in step S54 can further include calendar events from the device 14. The calendar events can include all current, future and past calendar events. For example, the user can have a calendar event for a dental appointment today, such that contact information for the dentist is transferred. Information regarding a location of contact based on an event can be transferred. For example, when dropping a child off at a team practice, information for the school and coach can be transferred.

The source information transferred in step S54 can further include favorite or saved points of interest. The points of interest can be based on location history or preferences (user-set or predicted) from external applications, such as Google Maps or Yelp. Additionally, the IVI 16 can access location history or point of interest information from the storage device 32 (FIG. 1) of the navigation system 24. For example, when a particular restaurant has been visited numerous times, contact information for the restaurant is transferred to the IVI 16.

The source information transferred in step S54 can further include vehicle maintenance information provided by an electronic computer system of the vehicle 10. For example, when the vehicle indicates maintenance is due, such as an oil change, contact information is transferred regarding the dealer where the maintenance is to be performed.

The source information transferred in step S54 can further include internet search history from the device 14. For example, when a particular store is searched for, contact information for the store is transferred.

The data received in step S52 is then categorized based on a predefined time frame and gathered as sub-data in step S56. The configuration table shown in FIG. 6 provides an exemplary method of categorizing and gathering the sub-data. Additional data can also be received from the device 14 and/or the IVI 16. Row #1 of the logic table of FIG. 7 corresponds to the configurable time frame table of FIG. 6 during which the frequency of a unique list element ($i_n$) is determined.

As shown in FIG. 6, the time frames can be defined based on the type of source information, or data, received. For example, for source information based on call history, the time frame can be broken down into the most recent two weeks (time frame a), two weeks prior to time frame a (time frame b), two weeks prior to time frame b (time frame c), and any time prior to time frame c. A weight factor can then be assigned based on the time frame. For example, time frame a can be assigned a weight factor of 75%, time frame b assigned a weight factor of 50%, time frame c assigned a weight factor of 25%, and time frame d assigned a weight factor of 10%. Accordingly, the weight factor is decreased the less recent in time the source information was generated. For example, a unique list element from the device's call history from within the last two weeks is weighted more than a unique list element from the device's call history from four weeks ago.

The weight factor can be assigned as desired. As shown in FIG. 6, the weight factor provides a larger weight factor to more recent data. In other words, more recent source information receive a higher priority (based on the configurable weight factor) than older source information. Factors that can be considered in determining a weight factor include, but are not limited to, outgoing versus incoming call combinations (higher weight to a phone number that is both received and dialed versus a phone number that is just received), contacts that are within the device's phonebook, spam call de-prioritization, burst calling frequency (such as many calls within one week, but no calls in other weeks), a call pattern over time (infrequent calls but consistent over time, such as a scheduled monthly conference call), group messaging contacts, social media contacts, location history and user-set preferences for locations and/or contacts.

As shown in FIG. 6, the time frames for different source information can be configured differently. The time frame for SMS source information is broken down into a time frame of the most recent two weeks (time frame e), two weeks prior to time frame e (time frame f), and two weeks prior to time frame f (time frame g). Different weight factors can also be assigned based on the type of source information. The most recent time frame (time frame e) for the SMS source information can be assigned a weight factor of 40%, which is less than the 75% weight factor assigned to the most recent time frame (time frame a) for call history source information. Time frame f and time frame g for the SMS source information are assigned weight factors of 30% and 10%, respectively. The weight factors can be set as desired based on the value of the source information to generating the favorite contacts list.

The process then moves to step S58 in which each unique list element ($i_n$) is analyzed for whether the unique list element has multiple occurrences, or repeats, within the time frame, which is expressed in row #2 of the logic table of FIG. 7. The received source information is analyzed to determine all the unique list elements within the time frame. The source information is then searched for repeating unique list elements within the specified time frame specified to determine the frequency of the unique list element ($i_n$) within the specified time frame. For example, all source information associated for the unique list element "mom" in the call history for time frame a is analyzed to determine the number of times that unique list element occurred during time period a. Accordingly, the received source information is analyzed to determine the unique list elements ($i_n$) and a frequency count for each unique list element within each time frame.

When a repeat unique list element ($i_n$) is found in step S60, the frequency count for that item is increased in step S64. For example, when three items for "mom" are found in the call history for time period a, the frequency count for "mom" during time period a based on call history source information is three (3). The process then returns to step S58 to continue analyzing the unique list elements. When no repeating items are round in step S60, a determination is made in step S62 whether all unique list elements for that source information during that time frame have been identified. When all unique list elements have not been identified, the process returns to step S58 to search for identify all unique list elements and a frequency count therefor. When all unique list elements have been identified, the process moves to step S66 in which a weighted value is assigned to each unique list element within the specified time frame (such as all the "mom" items in the call history source information during time period a).

In step S66, a weighting factor calculation is performed for each unique list element in the current time frame. For example, the frequency count of the "mom" call history data for time frame a is multiplied by the weight factor (75%) for that time frame for that source information and the resulting value ($X_n$) is stored in step S68 in a suitable storage device, such as the storage device 58 of the IVI 16 or the storage device 28 of the controller 18. Accordingly, the weighted value ($X_n$) for the unique list element "mom" occurring three times during time frame a is 3×0.75=2.25. The larger the occurrence frequency during the time frame, the larger the resulting weighted value for the unique list element ($i_n$).

A determination is then made in step S70 whether additional time frames remain to be analyzed for that unique list element ($i_n$). For example, when an analysis of time frame a for call history source information for the unique list element "mom" is complete, step S70 determines that additional time frames remain to be analyzed, such as time frame b for call history source information for the unique list element "mom". When another time frame remains to be analyzed, step S72 moves the analysis to the next time frame, such as time frame b for call history source information for the unique list element "mom", and the process moves to step S58, where the process is repeated for the next time frame. Row #'s 1-3 of the logic table of FIG. 7 are then repeated for all time frames for that source information to determine weighted values for the unique list element "mom", as indicated in row #4 of the logic table of FIG. 7.

Steps S58-S72 are repeated to search for all repeating elements for each time frame listed such that the frequency count for each time frame for the unique list element is determined, and the frequency count for each time frame is then multiplied by the predefined weight factor to obtain a weighted value for the unique list element for each time frame. These steps are repeated such that a weighted value is obtained for each unique list element for each time frame.

When a determination is made in step S70 that no more time frames are available, the process moves to step S74 to calculate a total sum of the frequency count, as shown in row #5 of the logic table of FIG. 7. The weighted values for the unique list element, such as for the unique list element "mom" based on call history source information for each of the time frames (time frame a, time frame b, time frame c and time frame d of FIG. 6) are added together to obtain a frequency count sum for that unique list element. For example, the weighed values for the unique list element "mom" in each of the time frames based on call history source information are added together $(X_n+Y_n+W_n+Z_n)$. The resulting value is stored in the storage 58 of the IVI 16. The weighted values for the unique list element, such as for the unique list element "mom" based on SMS source information for each of the time frames (time frame e, time frame f, and time frame g of FIG. 6) are added together to obtain a frequency count sum for that unique list element for that source information history. For example, the weighed values for the unique list element "mom" in each of the time frames based on SMS source information are added together $(T_n+U_n+V_n)$. Weighted values for the unique list element "mom" are calculated for each category of source information. The individual weighted values for each source information category are then calculated to obtain a final weighted value for the unique list element $(i_n)$.

In step S76, a determination is made whether each unique list element $(i_n)$ has been searched for each time frame for each category of source information. For example, a determination is made whether the unique list element "mom" has been searched for each time frame for each category of source information. When additional unique list elements have not been searched, the process moves to step S80 to identify the next unique list element, such as the unique list element "dad". As shown in row #6 of the logic table of FIG. 7, row #'s 1-5 of the logic table of FIG. 7 are repeated for each unique list element. The process then returns to step S56 to repeat the process for the next unique list element.

When all unique list elements have been searched for each time frame for each category of source information and a final weighted value has been calculated for each unique list element $(i_n)$, the process moves to step S78 to sort the unique list elements by the final weighted values. As shown in row #7 of the logic table of FIG. 7, each unique list element $(i_n)$ is sorted by the highest frequency count sum, which is the final value calculated in step S74 (row #5 of the logic table of FIG. 7). The unique list elements are sorted in descending order, with the unique list element having the largest value being the first result.

The process then moves to step S82 to populate the in-vehicle favorite contacts list with the sorted unique list elements from step S80. As shown in row #8 of the logic table of FIG. 7, the in-vehicle favorite contacts list is populated based on the largest frequency count sum (row #5 of the logic table of FIG. 7) and in descending order therefrom. As shown in FIG. 8C, the favorite contacts list 60 displays the names of the favorite contacts. The favorite contacts list 60 can include an available address associated with each contact listed in the in-vehicle favorite contacts list 60. The address can then be used by the navigation system 24 to drive to the location. The source information and the plurality of sources available to generate the in-vehicle favorite contacts list provides an in-vehicle favorite contacts list that is different from the favorite contacts list of the first mobile device 14.

A diagrammatic illustration of accessing and using the generated in-vehicle favorite contacts list is shown in FIGS. 8A-8C. The user pushes the "phone" button on a first screen 50 of the display 22 of the user interface 20 in FIG. 8A. The user then pushes a "quick dial" button 52 on a second screen 54 of the display 22 of the user interface 20 in FIG. 8B. The display 22 then changes to a third screen 56 in which the in-vehicle favorite contacts list 60 is displayed, as shown in FIG. 8C. The in-vehicle favorite contacts list 60 is generated with minimal interaction by the user. The user can then call a contact on the generated in-vehicle favorite contacts list 60 by selecting the contact on the in-vehicle favorite contacts list. For example, as shown in FIG. 8C, the user can select the contact "Mom" to initiate a phone call through the IVI 16.

The user can verbally request the IVI 16 to call a contact on the in-vehicle favorite contacts list 60 through the vehicle's voice recognition system. For example, the user can verbally request the IVI to call "Bob." When more than one "Bob" is on the in-vehicle favorite contacts list 60, the results can be displayed based on their weighted values. The results are displayed with the contact having the largest weighted value listed first, and in descending order therefrom. Additionally, when one contact is in the favorite contacts list and one similarly named contact is not, such as "Bob," priority is assigned to the contact on the in-vehicle favorite contacts list.

The source information transferred to the IVI can include identification of a vehicle occupant, such as through detection of the second mobile device 46. The identified vehicle occupant can be excluded from the in-vehicle favorite contacts list 60 in view of the occupant currently being in the vehicle 10. When the in-vehicle favorite contacts list 60 is updated, the formerly identified vehicle occupant can be added to the in-vehicle favorite contacts list when that person is no longer identified as being in the vehicle.

The in-vehicle favorite contacts list 60 can block an incoming call when the incoming call is not from a contact on the generated in-vehicle favorite contacts list 60. This filter minimizes driver distraction by only allowing calls from contacts on the in-vehicle favorite contact list. The blocked calls go straight to voicemail to avoid disrupting the driver while operating the vehicle 10.

The in-vehicle favorite contacts list 60 is auto-populated through the system and method illustrated in the flowcharts of FIGS. 3-5 and the tables of FIGS. 6 and 7 in accordance with exemplary embodiments of the present invention. The system and method use source information acquired from the first mobile device 14 after the IVI 16 to device 14 pairing is established, such as by Bluetooth protocol. Data can also be acquired from other sources, such as a second mobile device 46 or from components of the vehicle 10, such as the navigation system 24. A similar process to determine final weighted values for each unique list element is followed for source information received from other sources. The final weighted values for each device source are then added to obtain a final weighted value for each unique list element $(i_n)$. The favorite contacts list 60 is then populated on source information received from a plurality of different sources, such as the first mobile device 14, the second mobile device 26, and the navigation system 24.

When generating the in-vehicle favorite contacts list based on several sources, a unique list element not present in the first mobile device 14 can be excluded from consideration. For example, the second mobile device 46 includes call history source information for "Mary," who is not found in any category of source information from the first mobile device 14. The unique list element "Mary" is then excluded from the generated in-vehicle favorite contacts list.

The frequency and occurrent of when the IVI 16 updates the in-vehicle favorite contacts list 60 can be set as desired by the user. The IVI can update the in-vehicle favorite contacts list 60 when the vehicle ignition is cycled to the accessory/run setting, when a new device is paired to the IVI 16 (such as by Bluetooth or other suitable method), when connecting or reconnecting an existing device (such as the first mobile device 14), when the user allows permission, when the user sets a setting based on a time or event (for example, a designated time once a week), when the user selects the in-vehicle favorite contacts list as a primary method through the settings, after receiving or making a call while in the vehicle, when receiving or sending an SMS/text message while in the vehicle, when a vehicle door is sensed as opening or closing, and when a vehicle occupant is sensed (such as with sensors 38, 40, 42 and 44).

The in-vehicle favorite contacts list can be used for event-based notifications, authorization, access, and/or priority communication for people on the in-vehicle favorite contacts list. Authorization and access can include any source information available to the IVI 16, such as vehicle access, information access, make a phone call during an event, send an SMS/text message during an event, and so forth. For example, the IVI 16 can automatically send an SMS/text message to a contact on the favorite contacts list when the vehicle arrives at a location. Additionally, location information can be shared with contacts on the in-vehicle favorite contacts list. Priority communication can be made to contacts on the in-vehicle favorite contacts list during an emergency situation.

The exemplary system and method determines the best candidates to auto-populate the in-vehicle favorite contacts list 60 based on logic that considers at least source information, the frequency of communication with a particular contact with an associated phone type (e.g., mobile, office, home, and so forth) or phone number, and within a configurable period of elapsed time since the last communication. The in-vehicle favorite contacts list 60 is safely and easily generated while the user is in the vehicle 10 with minimal interaction required by the user. The in-vehicle favorite contacts list generated in accordance with the exemplary embodiments of the present invention prevents the user from having to burdensomely re-establish their favorite contacts from their device through the user interface 20 of the IVI 16. The system and method of generating an in-vehicle favorite contacts list in accordance with exemplary embodiments of the present invention can also be used to supplement or in conjunction with other favorite contacts list methods. For example, the transfer of a favorite contacts list (step S34 of FIG. 4) or manually setting a favorite contacts list (step S38 of FIG. 4) can be supplemented by the generation of the in-vehicle favorite contacts list (step S42 of FIG. 4). The in-vehicle favorite contacts list 60 provides an easy and useful access point for the user while in the vehicle 10 without requiring extra efforts from the user to establish such a favorite contacts list. The in-vehicle favorite contacts list 60 is a list of priority contacts, including people and places, that can be dynamically updated to adapt to the user's current and/or expected intention and/or situation.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the system and method of generating an in-vehicle favorite contacts list. Accordingly, these terms, as utilized to describe the present invention should be interpreted relative to a vehicle equipped with the system and method of generating an in-vehicle favorite contacts list.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of generating an in-vehicle favorite contacts list, comprising
   pairing a mobile device with an in-vehicle infotainment system;
   transferring data from the mobile device to the in-vehicle infotainment system, the data including a contacts list from the mobile device;
   weighting the transferred data to prioritize contacts of the transferred contacts list, a weight being assigned to the transferred data based on an occurrence frequency during a predetermined time frame, the occurrence frequency including one of
the number of incoming and outgoing calls to the same phone number,
the number of incoming and outgoing text messages to the same phone number, or
the social media contacts determined to be within a predetermined proximity of the mobile device;
generating an in-vehicle favorite contacts list based on the weighted data; and
displaying the generated in-vehicle favorite contacts list on a display in the vehicle.

2. The method of generating an in-vehicle favorite contacts list according to claim 1, wherein
the in-vehicle favorite contacts list is different from a favorite contacts list of the mobile device.

3. The method of generating an in-vehicle favorite contacts list according to claim 1, wherein
the generated in-vehicle favorite contacts list displays the names of the favorite contacts.

4. The method of generating an in-vehicle favorite contacts list according to claim 1, wherein
the data further includes vehicle call history.

5. The method of generating an in-vehicle favorite contacts list according to claim 1, wherein
the data further includes contacts from text messages exchanged with the first mobile device.

6. The method of generating an in-vehicle favorite contacts list according to claim 1, wherein
the data further includes contacts from social media applications installed on the first mobile device.

7. The method of generating an in-vehicle favorite contacts list according to claim 1, wherein
the data further includes calendar events from a calendar application installed on the first mobile device.

8. The method of generating an in-vehicle favorite contacts list according to claim 1, wherein
the data further includes location history of the first mobile device from a map application installed on the mobile device.

9. The method of generating an in-vehicle favorite contacts list according to claim 1, further comprising
verbally requesting the in-vehicle infotainment system to call a contact on the in-vehicle favorite contacts list; and
displaying each contact corresponding to the requested contact in a weighted order.

10. The method of generating an in-vehicle favorite contacts list according to claim 1, further comprising
calling a contact on the generated in-vehicle favorite contacts list by selecting the contact on the in-vehicle favorite contacts list.

11. The method of generating an in-vehicle favorite contacts list according to claim 1, wherein
the transferred data includes identification of a vehicle occupant.

12. The method of generating an in-vehicle favorite contacts list according to claim 1, wherein
the generated in-vehicle favorite contacts list includes an available address associated with each of the favorite contacts.

13. The method of generating an in-vehicle favorite contacts list according to claim 1, further comprising
blocking an incoming call when the incoming call is not from a contact on the generated in-vehicle favorite contacts list.

14. A method of generating an in-vehicle favorite contacts list, comprising
pairing a first mobile device with an in-vehicle infotainment system;
pairing a second mobile device with the in-vehicle infotainment system;
transferring data from the first mobile device to the in-vehicle infotainment system, the data including a contacts list from the first mobile device;
transferring data from the second mobile device to the in-vehicle infotainment system, the data including a contacts list from the second mobile device;
weighting the transferred data from the first mobile device;
weighting the transferred data from the second mobile device;
generating an in-vehicle favorite contacts list based on the weighted data from the first and second mobile devices; and
displaying the generated in-vehicle favorite contacts list on a display in the vehicle.

15. An in-vehicle favorite contacts list generating system, comprising:
an in-vehicle infotainment system configured to connect to a first mobile device to receive data therefrom;
a controller configured to weight the received data and to generate an in-vehicle favorite contacts list based on the weighted data, the received data is weighted by assigning a weight to the received data based on an occurrence frequency during a predetermined time frame, the occurrence frequency including the number of incoming and outgoing calls for the same phone number; and
a display configured to display the generated in-vehicle favorite contacts list.

16. The in-vehicle favorite contacts list generating system according to claim 15, wherein
the in-vehicle infotainment system is configured to connect to a second mobile device to receive data therefrom;
the controller being configured to generate the in-vehicle favorite contacts list based on the data received from the first and second mobile devices.

* * * * *